May 7, 1957 D. T. AYERS, JR 2,791,203
FLUID PRESSURE OPERATED MOTOR
Original Filed June 28, 1954 4 Sheets-Sheet 1

INVENTOR.
DAVID T. AYERS JR.
BY John V. Phillips
ATTORNEY

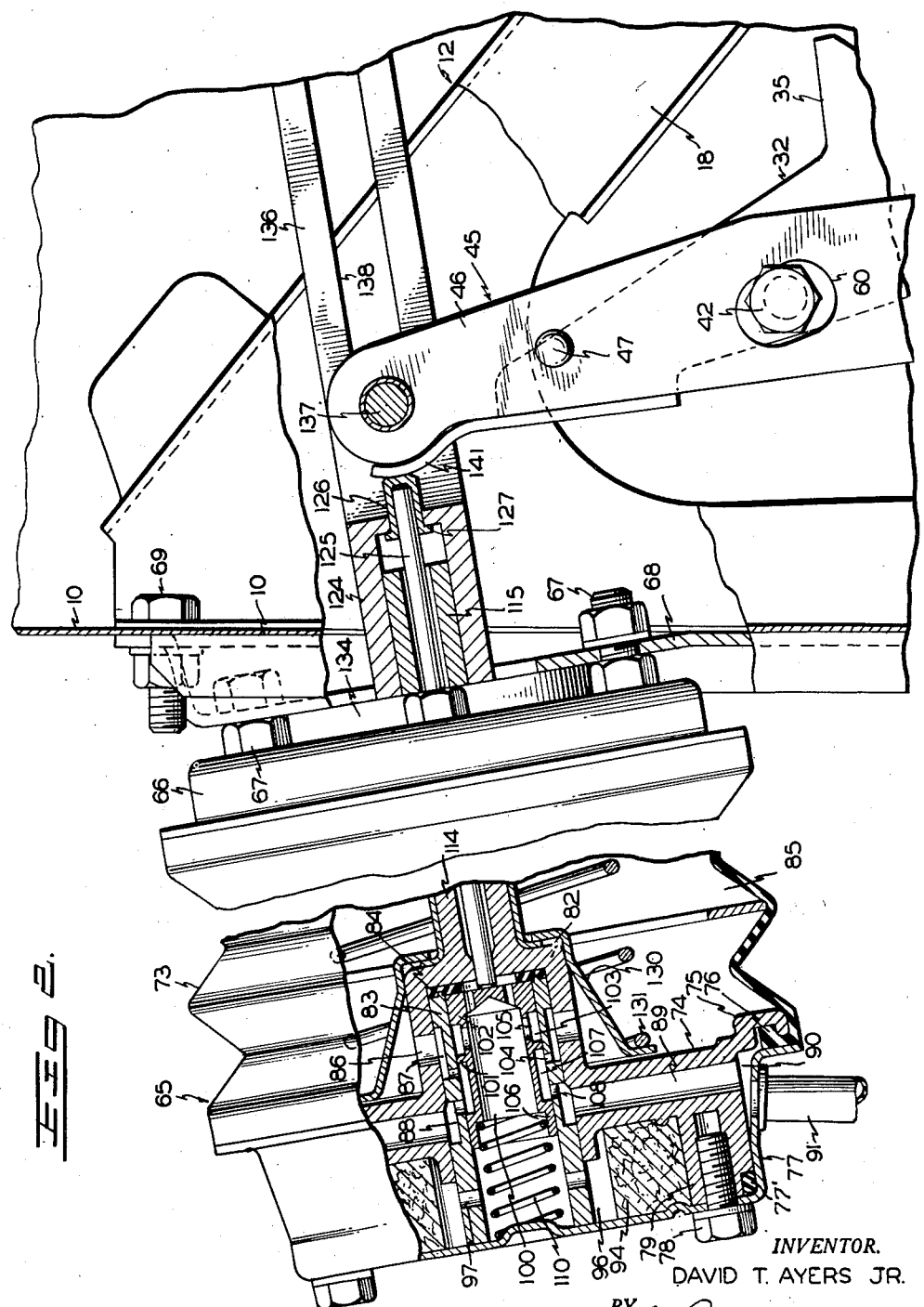

May 7, 1957 D. T. AYERS, JR 2,791,203
FLUID PRESSURE OPERATED MOTOR
Original Filed June 28, 1954 4 Sheets-Sheet 3
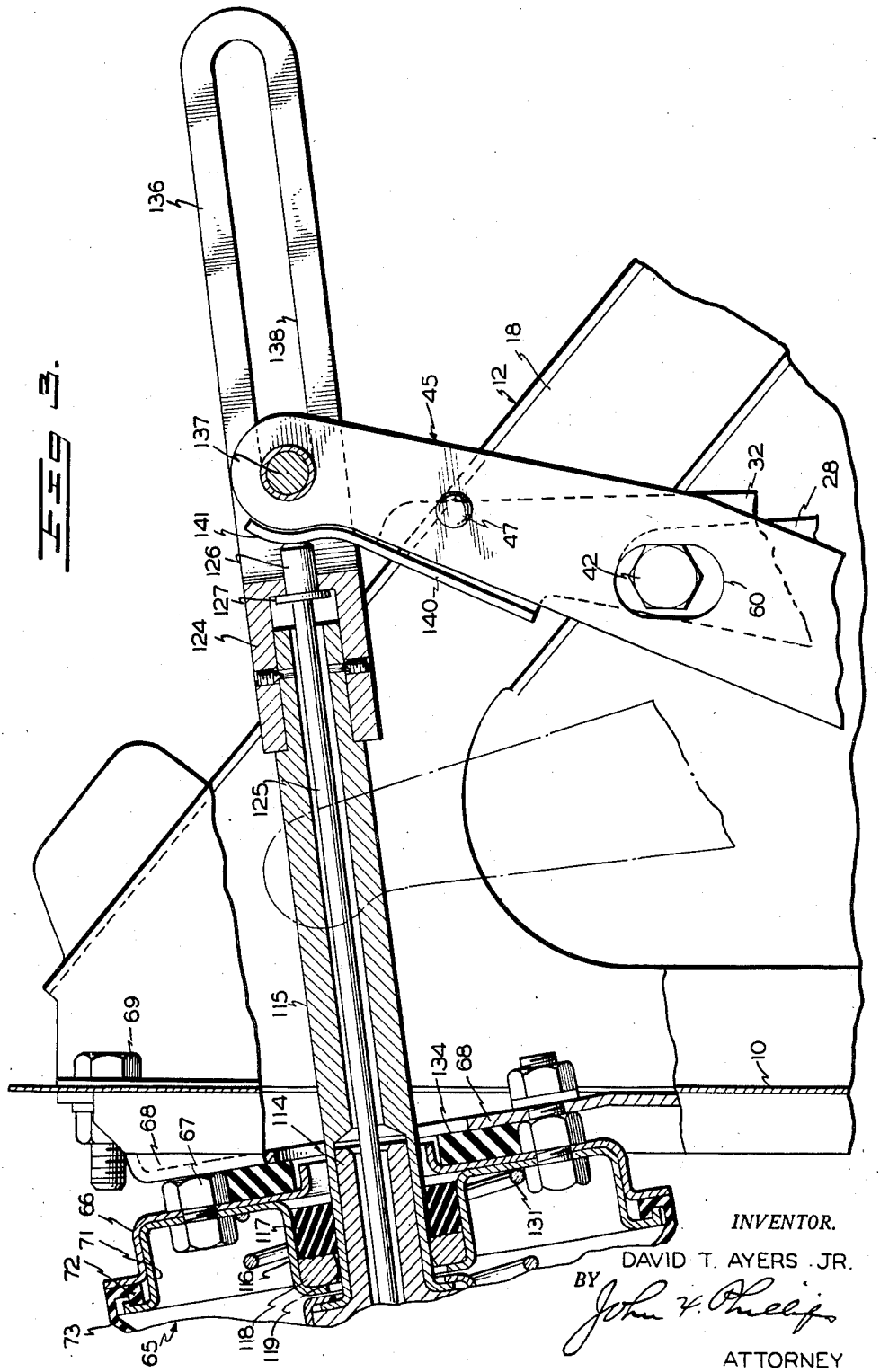
INVENTOR.
DAVID T. AYERS, JR.
BY
ATTORNEY

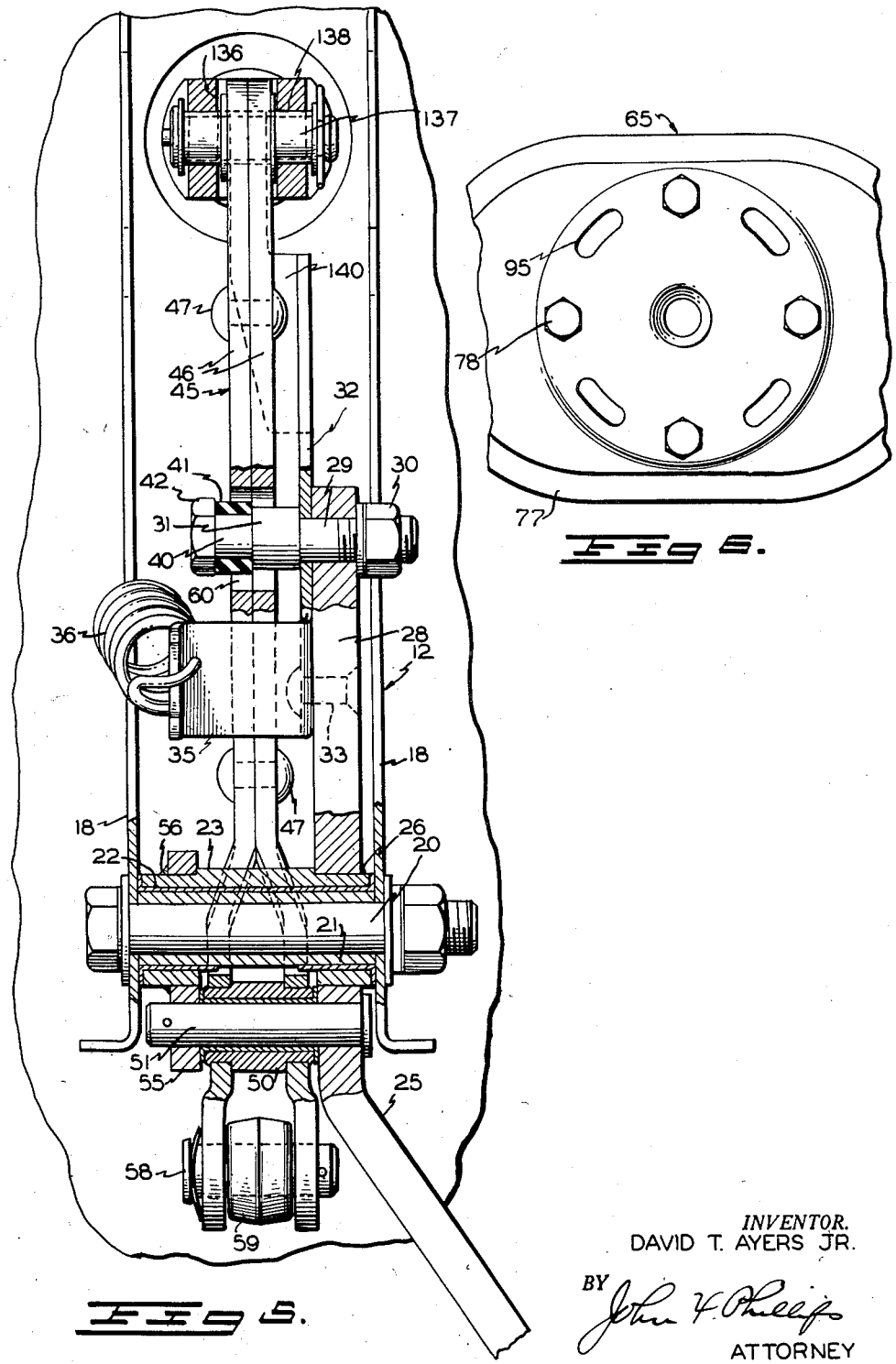

United States Patent Office 2,791,203
Patented May 7, 1957

2,791,203

FLUID PRESSURE OPERATED MOTOR

David T. Ayers, Jr., Birmingham, Mich., assignor to Kelsey-Hayes Company, a corporation of Delaware Original application June 28, 1954, Serial No. 439,674. Divided and this application April 21, 1955, Serial No. 502,996

13 Claims. (Cl. 121—41)

This invention relates to a fluid pressure operated motor and is a division of my application Serial No. 439,674, filed June 28, 1954.

In my copending application referred to, I have shown a novel type of booster brake mechanism for motor vehicles which possesses many advantages over prior constructions. The copending application referred to includes as a part of the combination therein a novel type of fluid pressure operated motor, features of which lend themselves in a particularly ingenious manner to use in combination with elements of a hydraulic vehicle brake mechanism. Such motor, however, embodies novel features which render the motor capable of use as a power source in other installations, and it is the motor referred to per se which forms the subject matter of the present invention.

An important object of the invention is to provide a novel type of fluid pressure operated motor particularly of the bellows type having spaced stationary and movable heads connected by a bellows and having a novel follow-up control valve mechanism which operates in a manner different from prior constructions to provide for a different manual controlling of the valve mechanism.

A further object is to provide such a motor wherein, contrary to prior practice, the movable valve element of the motor is biased to a motor energizing position and is normally held in a motor de-energizing position by means overcoming its biasing means.

A further objects is to provide such a mechanism whereby the entire valve mechanism is carried by the movable head of the motor and is operable from the opposite end of the motor through a valve stem which is manually progressively released to permit the biasing means for the movable valve element to move such element to a motor energizing position.

A further object is to provide a motor structure of the character referred to wherein the movable head of the motor also houses an air cleaner for supplying filtered air through the valve mechanism to the interior motor chamber.

A further object is to provide such a motor which is quite simple in construction and lends itself readily to mass production at a low cost.

Other objects and advantages of the invention will become apparent during the course of the following description.

In the drawings I have shown one embodiment of the invention. In this showing:

Figure 2 is an enlarged fragmentary side elevation of the upper portion of the apparatus, parts being broken away and parts being shown in section;

Figure 3 is a similar fragmentary sectional view showing the parts in solid lines in the positions they will occupy when the motor is fully energized;

Figure 5 is an enlarged sectional view on line 5—5 of Figure 1; and

Figure 6 is a fragmentary face view of a portion of the air cleaner cap and associated elements.

Figures 1, 4:
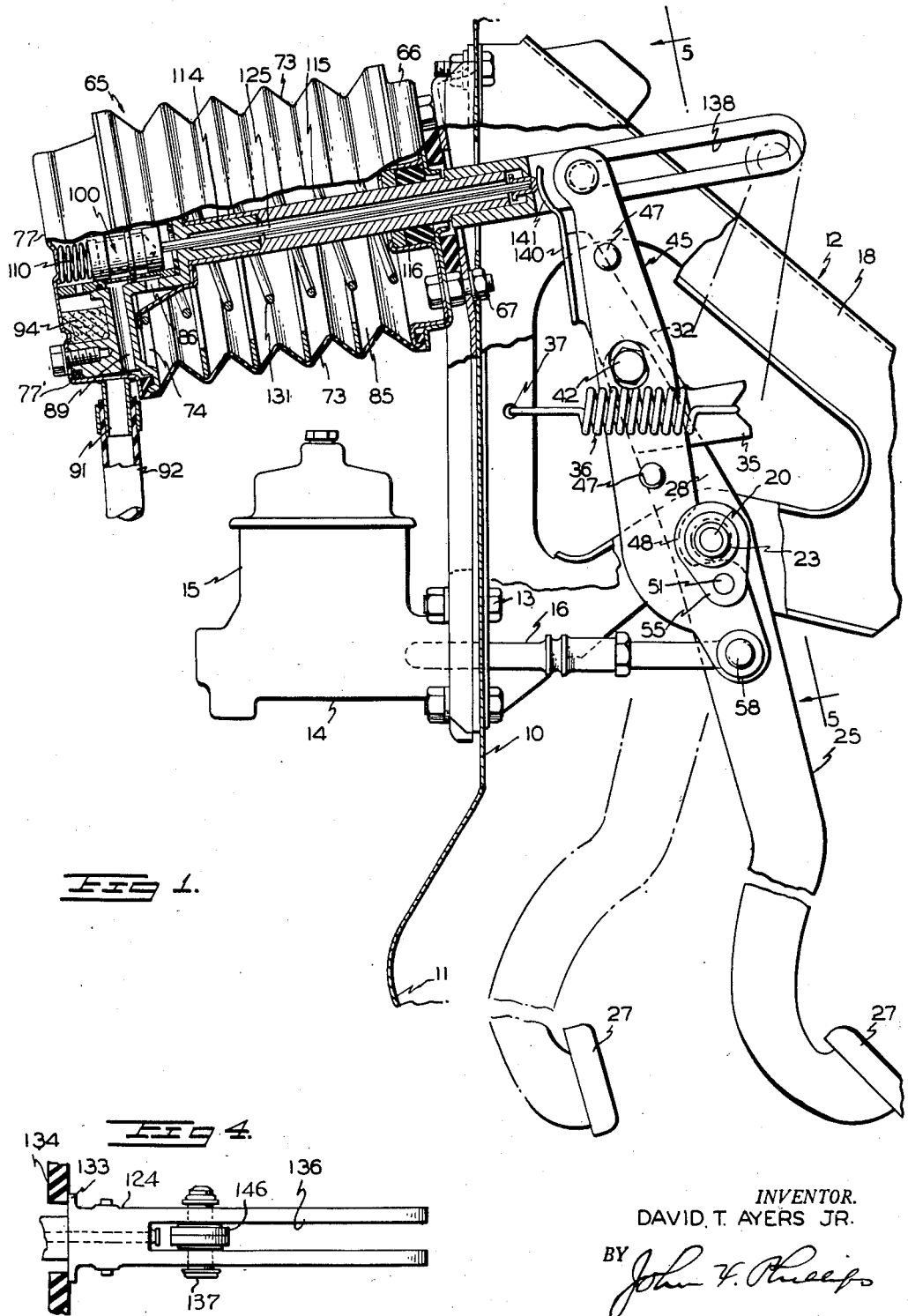
Figure 1 is a side elevation of the apparatus, parts being broken away and parts being shown in section, and with all of the parts shown in solid lines in their normal off positions.
Figure 4 is a plan view showing the clevis connection between the motor piston rod and the member to be operated, together with associated elements.

As stated above, the motor construction is shown in the copending application referred to in conjunction with a motor vehicle brake mechanism, the parts of which are illustrated in the present application in the interest of a complete disclosure of one use of the motor. It will become apparent, however, that the present application is directed to the motor construction per se.

Referring to Figure 1, the numeral 10 designates the fire wall of a motor vehicle at the lower end of which is the usual toe board 11. A substantially triangular bracket 12 is secured to the fire wall and projects rearwardly thereof. This bracket has its lower portion secured to the fire wall by bolts 13 which serve also to secure in position forwardly of the fire wall a master cylinder 14 having a reservoir 15, the piston (not shown) of the master cylinder being operable by a push rod 16.

The bracket 12 has opposite side walls 18 (Figure 5) between which are arranged suitable levers, etc., for controlling both the motor and the master cylinder when the motor is employed as a power source in conjunction with a vehicle braking system. Referring to Figure 5, a shaft 20 is supported by the side walls 18 of the bracket and is surrounded by a sleeve 21 around which is arranged a bushing 22 surrounded in turn by a sleeve 23 cut away at the bottom thereof (Figure 5) for a purpose which will become apparent. The sleeve 23 projects through a pedal lever 25 and is welded thereto as at 26, and the lower end of the pedal lever carries a pedal pad 27. The pedal lever is provided above the shaft 20 with an operating arm 28 through which projects a bolt 29 fixed in position by a nut 30. An intermediate head 31 on the bolt 29 seats against a bracket arm 32 to clamp such bracket to the arm 28. Below the bolt 29 the bracket 32 is riveted as at 33 to the lever arm 28. The lower end of the bracket 32 is provided with a lateral projection 35. A return spring 36 is connected at one end to the projection 35 and has its other end connected as at 37 to one of the bracket walls 18.

The bolt 29 (Figure 5) has a shank 40 surrounded by a resilient sleeve 41 maintained in position by the conventional head 42 of the bolt 29.

A reaction lever 45, preferably made up of bars 46, is arranged between the bracket walls 18, the members 46 being riveted together as at 47. The lower ends of the members 46 diverge and are arched as at 48 (Figure 1) to pass around the sleeve 23 out of contact therewith. Beneath such sleeve, the members 46 carry a thimble 50 rotatable on a pivot pin 51, one end of which projects through the pedal lever 25 while the other end passes through a plate 55 surrounding the sleeve 23 and welded thereto as at 56. At their lower extremities, the members 46 are pivoted as at 58 to a head 59 carried by the push rod 16. The reaction lever 45 is slotted as at 60 to receive the bushing 41, this bushing limiting relative movement between the levers 25 and 45.

The motor forming the subject matter of the present invention is indicated as a whole by the numeral 65, and it will become apparent that this motor is of the air suspended vacuum operated type. The motor comprises a stationary, preferably stamped head 66 (Figure 3) secured by bolts 67 to a bracket 68 carried by the fire wall 10. The lower end of this bracket is secured in position by the bolts 13 while the upper end of the bracket is fixed to the fire wall by bolts 69. A retaining ring 71 (Fig. 3) is fixed to the head 66 by the bolts 67 and fixes with respect to the head 66 a bead 72 at one end of a bellows 73 forming the body of the motor.

The other end of the bellows 73 is secured to a preferably die-cast movable head 74 having a peripheral flange 75 against which seats a bead 76 carried by the adjacent end of the bellows 73. The bead 76 is retained in position by a sheet metal cap 77 secured to the movable head 74 by screws 78 threaded in bosses 79 integral with the head 74. The head 74, as will be apparent, forms the pressure responsive element of the motor.

The head 74 is provided with an integral axial extension 82 forming a valve housing in which is arranged a valve sleeve 83 engaging at one end against a resilient washer 84 and having its other end engaged and retained in position by the cap 77. The housing 82 of the head 74 opens through the end of the head in the direction away from the stationary motor head, and it will be apparent that the sleeve 83 very readily may be slipped into position through the open end of the housing 82.

The space between the two motor heads 66 and 74 forms a variable pressure chamber 85 normally connected to the atmosphere, as will become apparent. The valve housing 82 is provided with radial ports 86 communicating with the motor chamber 85 and with an annular groove 87 formed around the sleeve 83. This sleeve is provided with a second annular groove 88 is fixed communication through radial passages 89, formed in the head 74, with an annular space 90 formed between the head 74 and cap 77. The space 90 communicates through a nipple 91 with one end of a flexible hose 92 (Figure 1) the other end of which is connected to a suitable source of vacuum, for example, the intake manifold of the motor vehicle engine. It will be apparent that the inner end of the cap 77 is sealed with respect to the head 74 by the bead 76 of the bellows 73. The outer end of the cap 77 is sealed relative to the head 74 as at 77'. Accordingly, the chamber 90, which is always open to the vacuum source, is effectively sealed against the entrance of air thereinto.

The cap 77 is preferably horizontally elongated (Figure 6) to correspond to the similarly elongated cross sectional shape of the bellows 73. In this connection, it will be noted that the bellows 73 may be circular in cross section, in which case the head 74 and cap 77 will be similarly shaped. However, where greater motor force is desired and one dimension, for example the vertical dimension, is limited, the motor may be elongated horizontally, as stated, to increase the total differential pressure available in the motor when it is energized. The central portion of the cap 77 is spaced from the body of the head 74 by the bosses 79 and in such space is arranged an air cleaner 94. The adjacent portion of the cap is provided with atmospheric openings 95 (Figure 6) to admit air to the air cleaner 94, and air from the cleaner flows into an annular space 96 surrounding the adjacent end of the valve sleeve 83. Such end of the valve sleeve is provided with radial ports 97 for the admission of air from the space 96 into the interior of the sleeve 83. A spool valve 100 is slidable in the sleeve 83 as clearly shown in Figure 2. This valve is provided with a pair of spaced lands 101 and 102 forming therebetween an annular groove 103 normally communicating with the annular groove 87 of the sleeve 83 through ports 104. This is true when the spool valve 100 is in its normal position shown in Figure 1. The valve 100 is further provided with ports 105 communicating between the groove 103 and the interior of the valve, which obviously is open to the atmosphere at all times through ports 97.

Spaced from the land 101, the valve is provided with a third land 106 forming with the land 101 an annular groove 107 in fixed communication through ports 108 in the sleeve 83 with the vacuum passages 89. The valve is movable from the normal motor de-energizing position in Figure 1 to the motor energizing position in Figure 2, in which case the valve groove 107 connects the ports 104 and 108 to exhaust air from the motor chamber 85.

The present valve mechanism is of the follow-up type as will become apparent. In valve mechanisms of this general type, a spring is employed for biasing the valve to a motor de-energizing position from which position it is manually movable to effect energization of the motor. As distinguished from such constructions, the present motor is provided with a spring 110 engaging at one end against the cap 77 and at its other end against the valve 100. The spring 110 constantly urged the valve 100 to move toward the right to the motor energizing position shown in Figure 2, the valve in such position fully energizing the motor, as will become apparent. Manual means is employed for normally holding the valve 100 against tension of the spring 110 in its normal position to connect the motor chamber 85 to the atmosphere, and such manual means may be of any desired type. The valve control means, as will become apparent, may be fixed in a position to hold the valve 100 in its normal position or it may be biased to accomplish this result by a spring stronger than the spring 110. When used in conjunction with a brake operating mechanism as disclosed in the copending application referred to, the spring 36 being stronger than the spring 110, holds the valve 100 in its normal off position in the absence of an operation of the brake pedal 25.

The valve housing 82 is provided with an integral axial extension 114 received in an axial recess in a tubular piston rod 115. This connection of the parts 114 and 115 is a matter of convenience in the use of proper materials for the motor head 74 and piston rod 115, but it will be apparent that the members 114 and 115 may be formed as an integral die-casting. Referring to Figure 3, it will be noted that the retaining cup 71 is provided with a cylindrical inner portion 116 in which is arranged a resilient packing 117 of any desired type, for example a conventional rawhide packing, backed up by a resilient bearing and seal 118 having a curved inner face 119 to facilitate the slight rocking of the rod 115 which will take place for a reason which will become apparent.

The rod 115 has a reduced outer end secured in a recessed clevis rod 124 (Figure 3). Through the extension 114 and rod 115 projects a valve control rod 125, the left-hand end of which (Figure 2) engages against the adjacent end of the valve 100. The other end of the rod 125 carries a nylon or similar cap 126 shouldered as at 127 to limit its movement relative to the member 124. Obviously, the spring 110 biases the valve 100 toward the motor energizing position in Figure 2, in which case the valve 100, its control rod 125 and cap 126 will occupy the positions shown in Figures 2 and 3, the right-hand end of the valve 100 (Figure 2) preferably engaging the resilient washer 84.

Within the motor is arranged a spring seat 130 against which is arranged one end of a relatively heavy return spring 131, the other end of this spring engaging the retaining cup 71 as shown in Figure 3. The flange of the spring seat 130 against which the spring 131 engages is slightly spaced from the head 74 so as not to interfere with communication between the motor chamber 85 and the ports 86. When the motor is de-energized, the spring 110 is compressed and the spring 131 maintains the bellows 73 extended. Movement of the motor head 74 to its normal position is limited by bosses 133 (Figure 4) engaging a rubber bumper 134 clamped between the head 66 and the bracket 68 (Figure 3).

Referring to Figures 1, 3, 4 and 5, it will be noted that the upper ends of the lever 45 extend into a slot 136 formed in the bar 124. Such lever ends carry a transverse pin 137 extending laterally into slots 138 in the bar 124, and the pin 137 is normally arranged in the left-hand ends of the slots 136 as viewed in Figure 3. When the piston rod moves to the right (Figure 3), the left-hand ends of the slots 138 will pick up the pin 137 and effect movement of the upper end of the lever 45 toward the right. It will be apparent, however, that so far as the present invention is concerned, any means may be employed for transmitting movement from the piston rod 115 to the member to be operated, it being understood that there need be no connection other than an abutting engagement between these elements.

The bracket 32 is shown as having at its upper end a transversely bent portion 140 (Figure 5) the upper end of which projects into the slot 136 (Figures 1, 2 and 3) and is curved as at 141 to form a contact element always in engagement with the thimble 126.

*Operation*

The parts normally occupy the positions shown in Figure 1. The valve groove 103 will communicate with the ports 104 and thence through groove 87 and ports 86 with the motor chamber 85. The groove 103 is always in communication with the atmosphere through the valve ports 105, the interior of the valve 100, ports 97 and air cleaner 94. Accordingly, atmospheric pressure will be present in the motor chamber 85 and the motor return spring 131 will hold the movable motor head 74 in the position shown in Figure 1. Movement of the motor head to such position is limited by the lugs 133 (Figure 4).

As previously stated, the spring 110 biases the valve 100 for movement toward the right as viewed in Figures 1 and 2, and the valve is held in its normal motor de-energizing position by suitable control means forming per se no part of the present invention. In the present case, the valve 100 is held in position by engagement of the finger 141 with the button 126 carried by the end of the rod 125, and the force for holding the valve 100 in off position is supplied by the spring 36. This spring obviously is stronger than the spring 110.

When the motor is to be energized, the control means is moved to release pressure against the valve rod 125, this being done in the embodiment illustrated by depressing the pedal pad 27. The pedal lever turns against the tension of the spring 36 and relieves pressure against the button 126, hence the valve 100 will move toward the right in Figure 1 and to the extent permitted by retraction of the finger 141 in the direction away from the button 126. Initial movement of the valve causes the valve groove 103 to be closed to the ports 104 by the land 101, and when this land registers with the ports 104, the valve will be in a lap position in which the motor chamber 85 is disconnected from the atmosphere. Any slight additional movement of the valve 100, effected by the spring 110, will crack the ports 104 to the valve groove 107 which is always in communication with a source of vacuum through ports 108, passage 89, nipple 91 and hose 92. Thus the motor chamber 85 not only will be cut off from communication with the atmosphere but will be opened to communication with the vacuum source, the extent of communication between the motor chamber 85 and the vacuum source depending upon the extent to which the valve land 101 uncovers the ports 104.

Atmospheric pressure is always present to the left of the motor head 74 as viewed in Figures 1 and 2. Accordingly, when the motor chamber 85 is connected to the vacuum source, differential pressures will affect the motor head 74 and the latter will start to move to the right from the position shown in Figure 1. The rod 124 will then deliver power to the element or device to be actuated. In this case the pin 137 will be operated through its engagement with the left-hand ends of the slots 138 in Figure 2. The slots 138 are unnecessary so far as the present invention is concerned, since a mere abutting relationship between the rod 124 and the element to be actuated is all that is necessary. Where the element to be actuated is a lever, connected to the rod 124 as shown, the swinging of the lever will cause a shifting of the position of the axis of the motor which is accommodated by virtue of the sealing elements 117 and 118 (Figure 3). Where power is delivered rectilinearly to the element to be operated, such swinging movement of the rod 124 is unnecessary. It also is unnecessary that the valve control finger or other element 141 be mounted to turn on a fixed axis since this member also can be moved rectilinearly coincidentally with the axis of the rod 125.

The valve mechanism provides a perfect follow-up action of the motor head 74 relative to movement of the valve control element 141, thus the element to be actuated can be moved any distance desired. In other words, if the valve control element 141 is moved, for example, one inch toward the right as viewed in Figure 2, the motor head will move a corresponding distance to effect similar movement of the element to be actuated, and any tendency of the motor head to overrun its intended position will lap the valve land 101 relative to the ports 104 and stop the evacuation of air from and the lowering of the pressure in the motor chamber 85.

Assuming that the motor is energized to its predetermined maximum extent, the valve 100 will be moved to the position shown in Figure 2, in which case the right-hand end of the valve will engage the resilient washer 84. It will be noted that the space within the washer is vented to the interior of the valve 100, thus preventing the building-up of any pressure at the right-hand end of the valve which would interfere with its movement toward the right in Figure 2. In a spool valve it is impossible to secure perfect sealing of the sliding surfaces of the valve and its sleeve, there occurring some slight seepage regardless of accuracy in manufacture. When the motor is energized to its maximum extent, the engagement of the valve with the resilient washer 84 completely seals the contacting surfaces of the valve and its sleeve from the atmosphere at the right-hand end of the valve.

The motor is de-energized by exerting to the left in Figure 2 a force against the rod 125 exceeding the loading of the spring 110. Thus the valve 100 will be returned to its normal position described above, and the motor chamber 85 again will be connected to the atmosphere.

The motor construction is highly advantageous for several reasons. For example, the arrangement of parts permits the stationary head to be fixed to a stationary support with the movable head 74 spaced therefrom and connected to the stationary head by the highly flexible bellows 73. The piston rod 115 will support the movable head 74 against any swinging due to sagging of the bellows intermediate its ends, the axis of the movable head always being held substantially coaxial with the stationary head. Moreover, if the clevis rod 124 is connected to the element to be operated by means which prevents upward and downward swinging of the clevis rod, except as predetermined by movement of the element to be operated, the latter element serves to support the movable head 74 against downward swinging movement without providing any additional guide means for the reciprocating parts. For example, if the element to be operated is a lever 45 of any type connected to the member 136 through the arrangement of the pin 137 and slot 138, the weight of the movable head 74 and its associated parts cannot cause them to swing downwardly from the positions shown in the drawings. In other words, the reciprocating parts to the right of the stationary head 66 are prevented from swinging upwardly by the pin 137, hence it is unnecessary to provide any other guide means for the reciprocating motor parts.

The motor also is highly advantageous because of its simplicity and ease of assembly. The head 74 is preferably die-cast and the sleeve 83 and valve 100 are simple screw-machine parts which readily may be inserted into position from the left-hand end of the motor as viewed in Figure 2. After these parts have been inserted with the right-hand end of the sleeve engaging the washer 84, the spring 110 is inserted; the air cleaner unit 94 is placed in position, and the cap 77 is then applied and secured in position by the screws 78. The seal 77' preferably is a simple O-ring, and this element together with the adjacent bead end of the bellows 73 serves to prevent leakage of air into the vacuum chamber 90. Thus it will be apparent that the motor parts are quickly and easily assembled. Moreover, the abutting contact of the reciprocating motor parts with the element to be operated and the similar contact of the button 126 with its valve control element 141 greatly simplify both the installation and control of the motor.

It is to be understood that the form of the invention shown and described is to be taken as a preferred example of the same and that various changes in the shape, size and arrangement of parts may be made as do not depart from the spirit of the invention or the scope of the appended claims.

I claim:

1. A fluid pressure motor comprising a pressure movable wall having one side subject to a given constant pressure, a follow-up control valve mechanism carried by said wall and comprising a movable valve unit including high and low pressure controlling portions having said normal positions subjecting the other side of said wall to said pressure to balance pressures on opposite sides of said wall and movable away from such position to subject said other side of said wall to a different pressure to energize said motor and effect movement of said wall, means biasing said valve portions in one direction away from said normal positions to energize said motor, and an axially movable control element in direct abutting engagement with said valve unit to move said portions thereof in the other direction to said normal position against said biasing means and manually movable in said other direction to release said valve portions for movement by said biasing means to energize said motor.

2. A fluid pressure operated motor comprising a casing having a pressure chamber and a movable wall subject at opposite sides to pressure in said chamber and to a source of constant pressure, a follow-up control valve mechanism comprising a movable valve unit including high and low pressure controlling portions having normal positions connecting said chamber to said source and movable away from such positions to connect said chamber to a source of different pressure a spring biasing said valve portions for movement in one direction away from said normal positions to tend to connect said chamber to said source of different pressure, an axially movable manually operable control element in direct abutting engagement with said valve unit to control movement of said valve portions in the other direction away from said normal positions under the influence of said spring, and means having mechanical connection with said manually operable element and normally overcoming said spring to hold said valve portions moved in said other direction to said normal positions.

3. A fluid pressure operated motor comprising a casing having a pressure chamber and a movable wall subject at opposite sides to pressure in said chamber and to a source of constant pressure, a follow-up control valve mechanism comprising a movable valve unit including high and low pressure controlling portions having normal positions connecting said chamber to said source and movable way from such positions to connect said chamber to a source of different pressure, a spring biasing said valve portions for movement in one direction away from said normal positions to tend to connect said chamber to said source of different pressure, an axially movable manually operable control element in direct abutting engagement with said valve unit to control movement of said valve portions in the other direction away from said normal positions under the influence of said spring, and means comprising a second spring stronger than said first named spring and having mechanical connection with said manually operable element and normally overcoming said first named spring to hold said valve portions moved in said other direction in said normal positions.

4. A fluid pressure operated motor comprising a stationary head, a movable head and a bellows connecting said heads and forming therewith a motor chamber, a follow-up valve mechanism carried by said movable head and comprising a pair of valve elements one of which is fixed to said movable head and the other of which is movable relative to said one valve element and normally occupies a position relative thereto connecting said motor chamber to the atmosphere, said other valve element being movable from said normal position to connect said motor chamber to a source of vacuum to cause said movable head to follow up relative to movement of said other valve element, a spring biasing said other valve element away from said normal position, a piston rod connected at one end to said movable head and projecting axially through said motor and through said stationary head, said stationary head having sealing means surrounding said piston rod to seal said motor chamber from the atmosphere, a manually operable element having mechanical connection with said other valve element to control movement thereof away from its normal position, and means having mechanical connection with said manually operable element for normally holding it in a normal position in which it holds said other valve element in its normal position.

5. A motor according to claim 4 wherein said means for holding said manually operable element in its normal position comprises a spring stronger than said first-named spring.

6. A motor according to claim 4 wherein said piston rod is tubular, and a valve control rod having engagement at one end with said other valve and having its other end projecting axially from the other end of said piston rod, said manually operable element engaging said valve control rod.

7. A motor according to claim 4 wherein said piston rod is tubular, a power transmitting member carried by said piston rod externally of said stationary head, a valve control rod mounted in said piston rod and having one end engaging said other valve, the other end of said valve control rod having a shoulder engageable with a portion of said power transmitting member to limit movement of said valve control rod in the direction in which said other valve element moves away from its normal position, said manually operable element engaging the last-named end of said valve control rod.

8. A fluid pressure operated motor comprising a stationary head, a movable head and a bellows connected between said heads and forming therewith a motor chamber, a follow-up valve comprising a pair of valve elements one of which is fixed to said movable head and the other of which is axially movable relative to said one valve element and normally occupies a position relative thereto connecting said motor chamber to the atmosphere, a spring biasing said other valve element away from said normal position to connect said motor chamber to a source of vacuum and cause said movable head to partake of a follow-up movement relative to said other valve element, manually operable means engaging said other valve element and normally holding it in its normal position, an air cleaner carried by said movable head and interposed between said valve mechanism and the atmosphere, and a housing covering said air cleaner and apertured for the flow of air thereto from the atmosphere, said housing forming with said movable head a vacuum chamber, said movable head having a vacuum passage connecting said vacuum chamber to said valve mechanism.

9. A fluid pressure motor comprising a pressure responsive unit including a head and a power transmitting member connected thereto, one side of said head being constantly subjected to a source of relatively high pressure, said motor having a chamber to which the other side of said head is exposed, a valve mechanism carried by said pressure responsive unit and having fluid connection with said source of high pressure, and with a source of relatively low pressure and with said chamber, said valve mechanism comprising a pair of relatively movable valve elements one of which is fixed to said pressure responsive unit and the other of which is movable relative to said one valve element and normally occupies a position with respect thereto connecting said chamber to said source of high pressure, said other valve element being movable in one direction from said normal position to disconnect said chamber from said source of high pressure and connect it to said source of low pressure, a spring biasing said other valve element for movement in said direction away from its normal position, and manually operable means having mechanical engagement with said other valve element and normally holding the latter in its normal position, said mechanical engagement being solely an abutting engagement whereby, upon a failure in said low pressure source, said manually operable means is freely movable independently of said other valve element.

10. A motor according to claim 9 wherein said source of high pressure is the atmosphere to which said one side of said head is constantly exposed, said other valve element having an atmospheric passage and said one valve element having an atmospheric port in constant communication with said passage, and an air cleaner carried by said head and through which air passes from the atmosphere to said port.

11. A motor according to claim 9 wherein said source of high pressure is the atmosphere to which said one side of said head is constantly exposed, said other valve element having an atmospheric passage and said one valve element having an atmospheric port in constant communication with said passage, an air cleaner arranged against said head and through which air passes to said valve mechanism, and a cover for said air cleaner carried by said head, said spring engaging at one end against said cover and at its other end against said other valve.

12. A motor according to claim 9 wherein said source of high pressure is the atmosphere to which said one side of said head is constantly exposed, said other valve element having an atmospheric passage and said one valve element having an atmospheric port in constant communication with said passage, an annular air cleaner arranged against said one side of said head, an annular cover fixed to said head and maintaining said air cleaner in position, said cover having atmospheric openings for admitting air to said air cleaner and said air cleaner being positioned to supply air to said port, said source of low pressure being a source of vacuum and said cover forming with said head a vacuum chamber, said head being provided with a vacuum passage connecting said vacuum chamber to said valve mechanism.

13. A fluid pressure motor comprising a pressure responsive unit including a head and a power transmitting member connected thereto, one side of said head being constantly subjected to a source of relatively high pressure, said motor having a chamber to which the other side of said head is exposed, a valve mechanism carried by said pressure responsive unit and having fluid connection with said source of high pressure, and with a source of relatively low pressure and with said chamber, said valve mechanism comprising a pair of relatively movable valve elements one of which is fixed to said pressure responsive unit and the other of which is movable relative to said one valve element and normally occupies a position with respect thereto connecting said chamber to said source of high pressure, said other valve element being movable in one direction from said normal position to disconnect said chamber from said source of high pressure and connect it to said source of low pressure, a spring biasing said other valve element for movement in said direction away from its normal position, a manually operable device having mechanical connection with said valve element, a spring stronger than said first-named spring biasing said manually operable device to a normal position in which it holds said other valve element in its normal position, said valve mechanism having an atmospheric port, an annular air cleaner arranged against said one side of said head and provided with an internal annular space communicating with said port, and a cover fixed to said head and provided with atmospheric openings radially outwardly of said space whereby air flowing through such openings flows through said air cleaner into said space, said spring having one end engaging against said cover and its other end engaging against said other valve element.

References Cited in the file of this patent

UNITED STATES PATENTS

| 1,960,481 | Monge | May 29, 1934 |
| 2,079,409 | Hunt | May 4, 1937 |
| 2,207,700 | Porter | July 16, 1940 |
| 2,532,960 | Stelzer | Dec. 5, 1950 |

FOREIGN PATENTS

| 252,380 | Great Britain | Apr. 21, 1921 |
| 858,806 | Germany | Dec. 8, 1952 |